June 20, 1939. A. D. LASSITER Re. 21,121

TALKING MOTION PICTURE APPARATUS

Original Filed April 5, 1932 2 Sheets-Sheet 1

INVENTOR.
Alwyn D. Lassiter,
BY John C. Brady
ATTORNEY

June 20, 1939. A. D. LASSITER Re. 21,121

TALKING MOTION PICTURE APPARATUS

Original Filed April 5, 1932 2 Sheets-Sheet 2

INVENTOR.
Alwyn D. Lassiter,
BY John B. Brady
ATTORNEY.

Reissued June 20, 1939

Re. 21,121

UNITED STATES PATENT OFFICE 21,121

TALKING MOTION PICTURE APPARATUS

Alwyn D. Lassiter, Philadelphia, Pa., assignor, by mesne assignments, to Western Electric Company, Incorporated, a corporation of New York Original No. 2,104,428, dated January 4, 1938, Serial No. 603,390, April 5, 1932. Application for reissue April 5, 1939, Serial No. 266,231

22 Claims. (Cl. 179—100.3)

Figure 1:
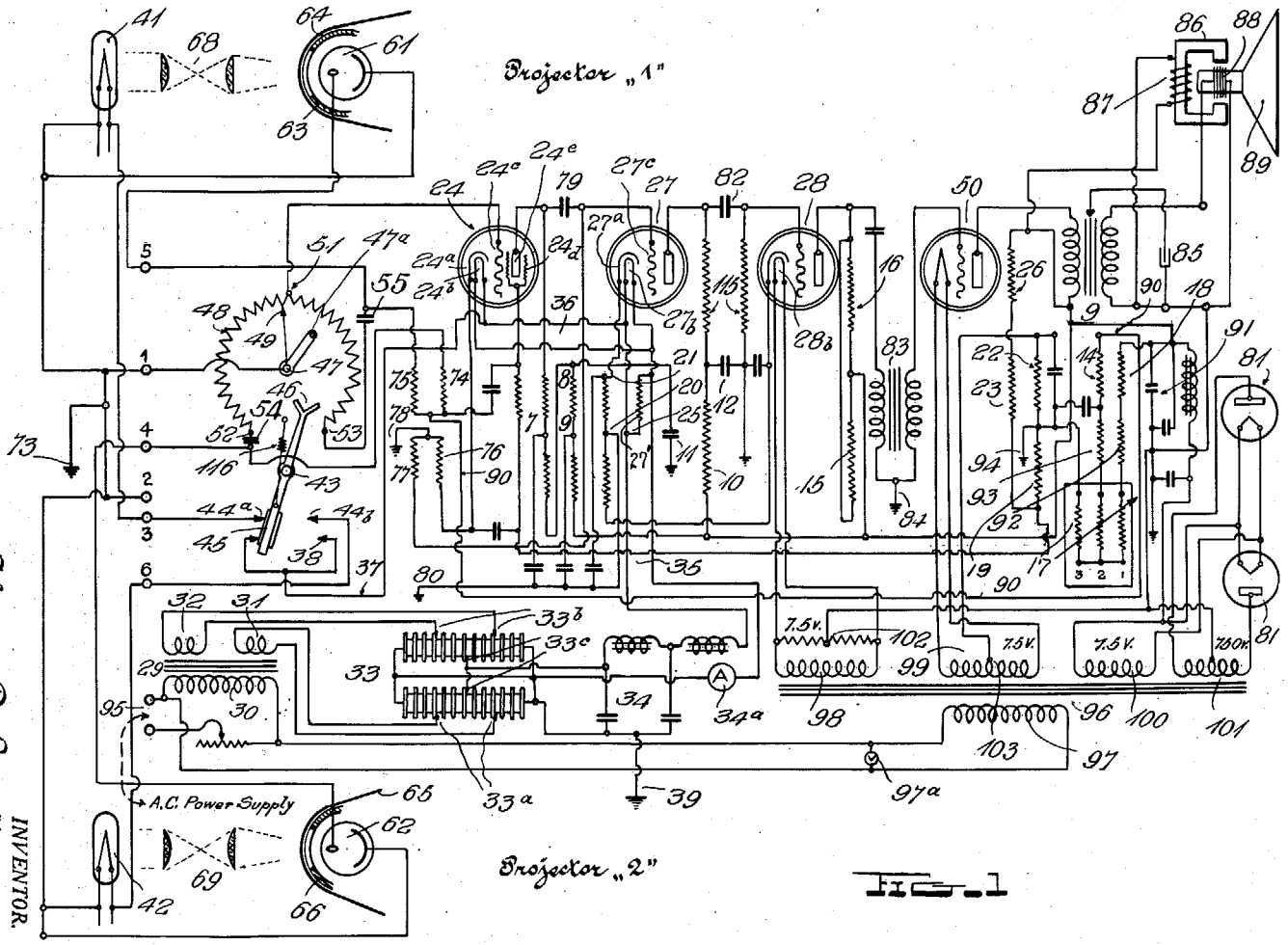

My invention relates broadly to talking motion picture systems and more particularly to a circuit arrangement for and construction of sound reproducing system for operation in conjunction with the projection of motion pictures.

One of the objects of my invention is to provide a circuit arrangement for talking motion picture systems wherein the entire equipment including the amplification system, sound reproducing device, exciter lamps and photoelectric cells of a talking motion picture system, may be operated from the usual alternating current source available in the projection booth of a theatre.

Another object of my invention is to provide a construction of portable sound reproducing apparatus for operation under control of the sound record on a film wherein the alternating current lighting circuit power may be utilized for energizing all parts of the sound reproducing system including the exciter lamp, the photo electric cell, the several circuits of the electron tubes employed in the amplification system and the field circuit of the sound reproducer.

Still another object of my invention is to provide a control circuit for a sound reproducing system by which the amplification circuit of the sound reproducing system may be controlled from either of two photoelectric cell systems installed on adjacent projectors in a motion picture booth with means for gradually fading the sound record of one film at the end of a reel on one projector into the sound record at the beginning of the film on the other projector.

A further object of my invention is to provide an arrangement of automatic switching device operative at the time that connections are established with the photoelectric cell circuit of one projector with the amplification system of the sound reproducer for energizing the exciter lamp in the sound head of that projector while de-energizing the exciter lamp in the sound head of the adjacent projector.

A still further object of my invention is to provide an amplification circuit for operating a sound reproducer, the input of the amplification circuit being controllable from the sound head of either of two adjacent projectors with means for fading in the effect of the sound head of one projector while fading out the effect of the sound head of the adjacent projector at the time of change-over between reels on the projectors.

Another object of my invention is to provide means for selectively controlling the volume of sound in a sound reproducing system controlled from a sound film record for insuring uniform reproduction of sound from either of two projectors which are operated for successive runs for displaying successive reels of a motion picture with sound accompaniment.

Still another object of my invention is to provide a circuit arrangement for an amplification system in a talking motion picture apparatus including successive electron tube stages successively coupled conductively and inductively in an arrangement which insures the accurate reproduction of sound over a broad audio frequency range with minimum distortion.

Another object of my invention is to provide a construction of portable mounting means for the amplification and sound reproduction apparatus of my invention for increasing the portability of the equipment.

Figure 2:
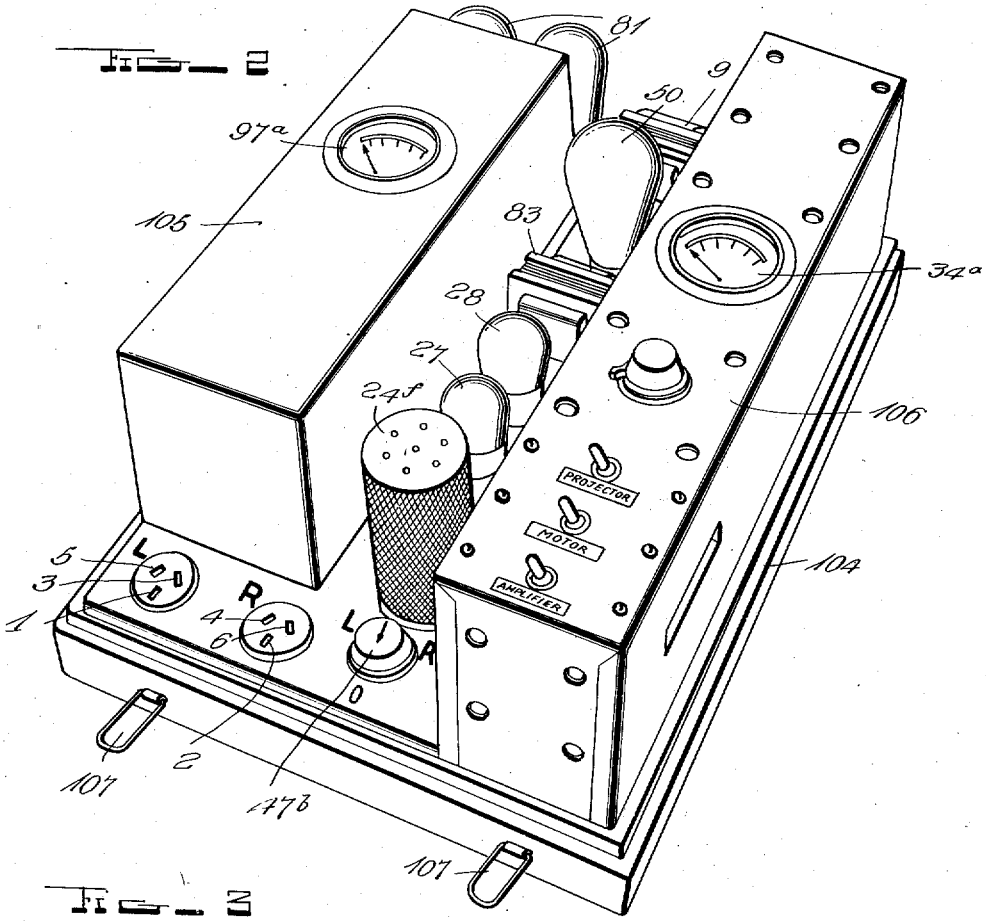
Figure 3:
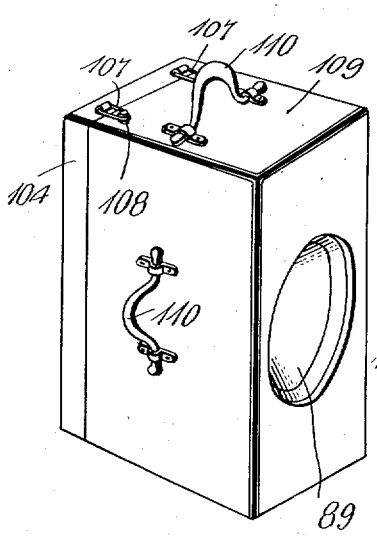
Figure 4:
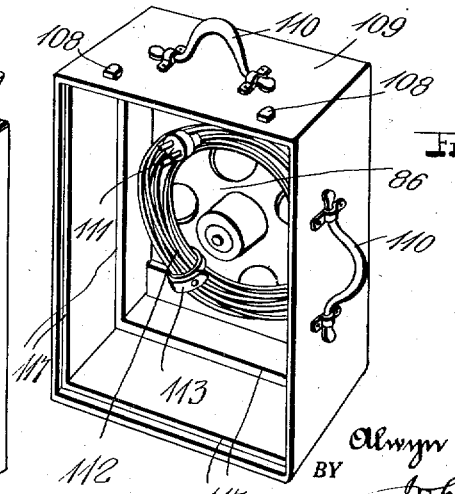

Other and further objects of my invention reside in the sound reproducing apparatus and circuit arrangement therefor as set forth more fully in the specification hereinafter following in which:

Figure 1 diagrammatically illustrates the circuit arrangement of the sound reproducing system of my invention; Fig. 2 is a perspective view of the amplification apparatus of my invention with the cover thereof removed to show the mounting of the parts therein; Fig. 3 is a perspective view of the portable carrying case and sound reproducer forming part of my invention; and Fig. 4 illustrates the covering member of the portable carrying case and showing the manner of mounting the sound reproducer therein.

This application is a continuation in part of my application Serial No. 579,972 filed December 9, 1931, entitled Audio frequency amplification system, now Patent No. 2,072,114, granted March 2, 1937.

Referring to the drawings in detail, I have designated the terminals of the amplifier system and power supply circuits for the exciter lamps of the projectors at 1, 2, 3, 4, 5, and 6. The control tube of the amplifier system is indicated at 24. The tube 24 is a five electrode tube including a cathode 24*a*, a heater element 24*b*, a control grid 24*c*, a shield grid 24*d* and an anode 24*e*. The output circuit of the control tube 24 is coupled through a resistance and capacity coupling system 7—19 to the input circuit of the power amplifier tube 27 which is in turn coupled through resistance-capacity coupling 115—12—82 to the input circuit of power amplifier tube 28. The output circuit of power amplifier tube 28 is coupled through audio frequency transformer 83 to the input circuit of power amplifier tube 50. The sound reproducer 86 is shown as including an electromagnetic field 87 and a movable armature winding 88 connected with the conical diaphragm 89. The output of the power amplifier tube 50 connects through transformer 9 to armature winding 88 of the sound reproducer 86. A condenser 85 is employed connected between the grounded side of the secondary of transformer 9 and the core of the transformer for eliminating undesired noises in the sound reproducing circuit. The field winding 87 of the sound reproducer 86 is energized from rectified alternating current supplied from the power supply system which includes the rectifier tubes 81. The entire apparatus is energized from the alternating current power supply source usualy available in a motion picture booth or in a residence where the apparatus of my invention may be readily operated. The alternating current power supply is connected with terminals 95 which lead to the primary circuits of transformers 29 and 96. Transformer 29 includes primary winding 30 and secondary windings 31 and 32. Transformer 96 includes primary winding 97 and secondary windings 98, 99, 100, and 101. The secondary windings 31 and 32 connect to points 33*a* and 33*b* respectively on the dry type rectifier 33. The output terminals of the dry type rectifier 33 are represented at 33*c* connected through filter circuit 34 to the output leads 35, which leads extend to the heater filaments 24*b* and 27*b* of the tubes 24 and 27 respectively. Proper regulation of the current supplied to the heater filaments 24*b* and 27*b* is obtained by means of resistance 27′ connected across power supply circuit 35. The distribution circuit to the heated filaments 24*b* and 27*b* has been illustrated at 36. One side of the circuit is extended through conductor 37 to the contacts 38 of the shiftable switch 43. The switch 43 has a yoke extension 46 thereon which is disposed in the path of the angularly shiftable arm 47*a* movable about pivot 47. The arm 47*a* engages the yoke 46 of switch arm 43 and serves to shift switch arm 43 either to the right or the left against the action of spring 116. Spring 116 operating upon switch 43 enables switch 43 to be mounted in the limiting position to which the switch is moved. Switch 43 carries contacts 45 which serve to shunt fixed contacts 44*a* and 44*b* with the contacts 38. Contact 44*a* connects with terminal 3 of the input system to the amplifier. Contact 44*b* connects to terminal 6 of the input system to the amplifier. A connection extends from terminal 3 to the incandescent filament of exciter lamp 41 in the sound head of the first motion picture projector. The other side of the incandescent filament of exciter lamp 41 connects to terminal 1 which is connected to ground 73.

It will be observed that the opposite side of the power supply circuit leading from filter 34 is grounded at 39 so that in this way a return path to the power source is established from exciter lamp 41. The contact 44*b* which connects to terminal 6 of the amplifier electrically connects with one side of the exciter lamp 42 of the second projector. The opposite side of incandescent lamp 42 is connected to terminal 2 which is connected to ground 73. The control tube 24 has the control grid 24*c* thereof connected to a mid-tap 51 on potentiometer 48. The end 52 of potentiometer 48 connects through condenser 54 to terminal 4 of the amplifier system to the cathode of light sensitive cell 62 in the second sound head projector, the anode of which is connected to ground through terminal 2. The opposite end 53 of potentiometer 48 connects through condenser 55 with terminal 5 of the amplification system which connects to the cathode of light sensitive cell 61 in the first sound head projector. The anode of light sensitive cell 61 connects to ground through terminal 1. The circuit is thus completed to the potentiometer 48 from light sensitive cells 61 and 62. In order to render either of the sound heads effective upon the control tube 24, the movable contact 49 which extends from the rotary pivot 47 is moved to selected positions along potentiometer 48. The contact 49 is connected to terminal 1 of the amplifying system and is electrically connected to ground 73. Thus a predetermined resistance extending between terminal 52 and contact 49 on potentiometer 48 may be included in shunt with light sensitive cell 62 when the cell is electrically connected in the input circuit of control tube 24. Similary a portion of resistance extends between contact 49 and terminal 48 may be included in shunt with light sensitive cell 61 for effectively controlling the operation of the light sensitive cell with respect to the control tube 24. By moving contactor 49 over potentiometer 48 various degrees of control from the light sensitive cells 61 and 62 are obtained so that the control by one light sensitive cell may be gradually faded out while the control of the other photoelectric cell is being faded in. This enables the amplification system to be utilized in a motion picture projection booth where the amplification apparatus is mounted to cooperatively function with two projectors.

The sound reproduction system for the first projector includes exciter lamp 41, optical system 68, sound film 64 light sensitive cell chamber 63 and light sensitive cell 61. The sound head on the second projector includes incandescent lamp 42, optical system 69, sound film 65, light sensitive cell chamber 66 and light sensitive cell 62.

In order to control the volume of the reproduced sound, I provide a set of resistors 17 which are electrically connected in the arrangement shown for controlling the potential supplied to the input circuit of control tube 24 in series with light sensitive cell 61 or 62. The resistors 17 electrically connect with impedances 18—92 and 14—93 in the separate circuits shown. Impedances 14—93 connect through conductor 90 with resistors 74 and 75 which respectively control the current to the light sensitive cell circuits including light sensitive cells 61 and 62 and regulate the current to the input of control tube 24. Resistors 18 and 92 connect with the filter circuit 91 in the output of the full-wave rectifier constituted by rectifier tubes 81. Power is supplied to the tubes 81 from windings 100 and 101 on transformer 96. Winding 100 supplies cathode heating current while winding 101 supplied anode potential. Secondary winding 99 of transformer 96 supplies cathode heating current for power amplifier tube 50. The mid-tap connection 103 which extends from winding 99 passes to ground 94 through resistor 22 and serves to impose a C-bias on tube 50. The secondary winding 98 supplies heating current for the heater filament 28*b* of power amplifier tube 28. A potentiometer is shunted across winding 98 and the mid-tap 102 thereof electrically connected with the mid-tap on secondary winding 101 and the grounded side of the filter circuit 91 which connects with the rectifier tubes 81. Resistors 22 and 19 having the midconnection thereof grounded at 94 provide means for controlling the potential to the light sensitive circuits and to the input of the control tube 24. Resistance elements 23 and 26 are arranged in circuit with impedance 19 and electrically connected with the field winding 87 of sound reproducer 86 for regulating the potential supplied to the field winding of the sound reproducer. The proper biasing potential is supplied to the input of power amplifier tube 27 through resistors 8—9 and 21—20 arranged as shown. Connection is made to ground at 80 from taps 7, 9, and 20 as shown. Proper potential is supplied to the output circuit of tube 27 through resistance 10. The required operating potential is supplied for the output circuit of tube 28 through resistors 15 and 16 connected as shown. The windings of transformer 83 are connected to ground at 84 for obtaining the required operating potential on the grid of tube 50 as shown.

The required operating potential for anode 24*e* of control tube 24 is obtained by means of the connection through the resistors indicated at 7, 8, and 9. The required potential for biasing the grid 27*c* of tube 27 is obtained through resistance 77 connected to ground 78. The input circuit of control tube 24 is completed from cathode 24*a* through resistance 76 to ground 78. The current from the dry type rectifier and associated filter 34 is indicated by meter 34*a*. The voltage supplied to the primary winding 97 of power transformer 96 is indicated by voltmeter 97*a*.

In Fig. 1 I have illustrated the relative arrangement of the amplifying apparatus as being disposed between projector #1 and projector #2.

Figs. 2, 3, and 4 illustrate the manner in which the parts of the amplifying apparatus and sound reproducer are mounted. Fig. 2 shows a base 104 having protective casings and shields 105 and 106 thereon which house parts of the coupling circuits, power transformers, the dry type rectifier and the elements of the filter system. The base 104 has latch members 107 at each end thereof adapted to cooperate with hook members 108 carried by the cover portion 109 of the carrying case in which the sound reproducer 86 is mounted. The carrying case has handle members 110 attached thereto to facilitate transportation of the equipment. The cone diaphragm of the sound reproducer 86 is shown at 89 arranged at one wall of the casing which houses the sound reproducer. A detachable plug 111 is connected with a flexible conductor 112 which may be coiled and stowed within the casing 109 by means of securing strip 113. The supporting base 104 provides mounting means for electron tubes 24, 27, 28, 50, and 81 as shown. The supporting base carries transformers 83 and 9 as shown. The sockets indicated at L and R on the base 104 contain the terminals 1, 3, and 5 and the terminals 2, 4, and 6 for connection through plugs with the sound heads on the opposite motion picture projectors in accordance with the wiring arrangement illustrated in Fig. 1. The control tube 47*b* is secured to the rotatable shaft 47 illustrated in Fig. 1 and is shiftable in the direction L or R for the purpose of fading in and fading out the respective sound heads. I have shown an electrostatic shield 24*b* positioned over the control tube 24. The casings 105 and 106 provide mounting means for control switches and also serve to support meters 97*a* and 34*a*. As heretofore noted, meter 97*a* reads the voltage across the primary of power transformer 96 while meter 34*a* shows the current to the heater filaments 34*b* and 27*b* and to the exciter lamps 41 and 42. The cover 109 is provided with peripheral latches 117 thereon which serve as supports for the base 104 which carries the amplifying apparatus.

The compact arrangement of the amplification system of my invention has proven highly satisfactory in operation. The cooperative effects obtained by the conjoint operation of the conductive and inductive couplings in the different stages of the amplifier is such as to permit the supplying of the circuits of the exciter lamps directly over the circuit from the filament heaters of the first stages of amplification in the amplification system and the utilization of direct current at the exciter lamps where steady illumination is essential. The conductive and inductive coupling system also insures accurate reproduction in the low projection of frequencies encountered in talking motion picture systems as well as throughout the musical frequency range. The arrangement of the circuits is such that undesired oscillations are prevented in the audio frequency range obtained. The light sensitive cells may be supplied from the same source of power supply which furnishes potential to the plate circuits of the amplifier tubes thereby rendering the apparatus extremely compact. Movement of control tube 47*b* on base 104 enables the sound record on one projector which is nearing the end of a reel to be faded out while the sound record on the first reel of the adjacent projector is being faded in.

I have found the apparatus of my invention efficient in its operation and capable of inexpensive manufacture and although I have described my invention in one of its preferred embodiments I desire that it be understood that modifications may be made and that no limitations are intended other than are imposed by the scope of the appended claims.

What I claim as new and desire to secure by Letters Patent of the United States is as follows:

1. Talking motion picture apparatus comprising an amplification system, a sound reproducer connected with said amplification system, a control tube connected with the input of said amplification system, a pair of light sensitive cells subjected to variations of light under control of independent film records, a potentiometer connected between the input circuit of said control tube and said light sensitive cells, and means for variably controlling the effective value of said potentiometer with respect to each of said light sensitive cells and for fading the effect of the sound record to which one of said light sensitive cells is subjected in, while fading the sound record to which the other of said light sensitive cells is subjected out in said sound reproducer, and a source of rectified and filtered alternating current operatively connected to the aforesaid amplification system, the field of the sound reproducer, and the light sensitive cells.

2. Talking motion picture apparatus comprising an amplifier system, a sound reproducer connected with the output of said amplifier system, a control tube connected with the input of said amplifier system, a pair of independent sound heads each including a light sensitive cell controlled by a sound film record, means electrically connecting said light sensitive cells with the input circuit of said control tube, and a variable impedance device for selectively controlling the effect of said light sensitive cells upon said control tube in a reciprocal manner, and a source of rectified and filtered alternating current operatively connected to the aforesaid amplification system, the field of the sound reproducer, and the light sensitive cells.

3. Talking motion picture apparatus comprising an amplification system, a sound reproducer controlled by said amplification system, a control tube connected with the input circuit of said amplification system, separate sound heads for motion picture projectors each including a light sensitive cell forming part of the talking motion picture apparatus, an impedance device coupling the light sensitive cell in each of said sound heads with the input of said control tube, and means for varying the effect of said impedance device on said light sensitive cells in a reciprocal manner for fading in the effect of one of said sound heads while fading out the effect of the other of said sound heads with respect to the operation of said sound reproducer, and a source of rectified and filtered alternating current operatively connected to the aforesaid amplification system, the field of the sound reproducer, and the light sensitive cells.

4. Talking motion picture apparatus comprising an amplification system, a source of power for energizing the circuits of said amplification system, a sound reproducer connected with the output of said amplification system, a pair of sound heads each including an exciter lamp, a light sensitive cell and a sound film record for varying the effect of said exciter lamp on said sound film record, means for coupling said light sensitive cells to the input circuit of said control tube, means for variably controlling the effect of one of said light sensitive cells with respect to the effect of the other of said light sensitive cells, and means controlled by the operation of the last mentioned means for controlling the operation of the exciter lamps of said sound heads from the source of power which energizes said amplification system.

5. Talking motion picture apparatus comprising an amplification system, a source of power for energizing the circuits of said amplification system, a sound reproducer connected with the output of said amplification system, a control tube connected with the input of said amplification system, a pair of sound heads each including an exciter lamp, a light sensitive cell and a film record for variably controlling the effect of the exciter lamp upon said light sensitive cell, an impedance element, means for selectively connecting said light sensitive cells to the input circuit of said control tube through said impedance element, means for selectively controlling the value of said impedance with respect to each of said light sensitive cells, and a switch actuated by said last mentioned means for completing connections between said power source and each of said exciter lamps when the sound head with which the said exciter lamp is associated is rendered effective for controlling said sound reproducer.

6. Talking motion picture apparatus comprising a multi-stage amplifier each including an electron tube having a filament, a control grid and an anode electrode, circuits interconnecting said electrodes, an alternating current power supply circuit, means for deriving rectified current from said power supply circuit, circuits for energizing the filaments of selected electron tubes from alternating current derived from said power supply circuit, circuits for energizing the filaments of others of said electron tubes from rectified current derived from said power supply circuit, a sound reproducer connected to the output circuit of the last amplification stage, light sensitive cells connected to the input circuit of the first amplification stage, exciter lamps individual to each of said light sensitive cells and means for energizing said exciter lamps from the filament circuits of said electron tubes which are energized from rectified current.

7. In a talking motion picture apparatus, an alternating current power supply circuit, an electron tube amplification system having a sound reproducer connected with the output circuit thereof and a light sensitive cell connected with the input circuit thereof, an exciter lamp adjacent said light sensitive cell and means for energizing said exciter lamp and certain of the electron tubes in said amplification system from rectified current derived from said alternating current power circuit.

8. Talking motion picture apparatus comprising a multi-stage electron tube amplification system, a sound reproducer connected with the output of said amplification system, an alternating current power supply circuit for energizing the power circuits of said electron tube amplification system, a light sensitive cell connected in the input circuit of said amplification system, an exciter lamp focused upon said light sensitive cell for operation in conjunction with a sound film for variably controlling said light sensitive cell and rectification means connected with the alternating current power supply circuit for energizing portions of the electron tubes in certain of the amplification stages of said amplification system and energizing said exciter lamp for effecting the operation of said sound reproducer.

9. Talking motion picture apparatus comprising an alternating current power supply circuit, a multi-stage amplification system comprising a plurality of electron tubes each having filament, a control grid and a plate, a sound reproducer connected to the output circuit of said amplification system, a light sensitive cell connected with the input circuit of said amplification system, means for deriving rectified alternating current and raw alternating current from said alternating current power supply circuit, means for energizing the filaments of certain of said electron tubes from raw alternating current, a circuit for energizing the filaments of others of said electron tubes from rectified alternating current, an exciter lamp disposed adjacent said light sensitive cell and circuit connections for energizing said exciter lamp from rectified alternating current derived from said last mentioned circuit.

10. In a talking motion picture system, an amplification circuit, a sound reproducer connected with the output of said amplification circuit, a control tube connected with the input of said amplification circuit, a pair of resistance elements connected in the input of said control tube, a light sensitive cell connected across a portion of each of said resistance elements, an exciter lamp individual to each of said light sensitive cells, and means for controlling the energization of each of said light sensitive cells and simultaneously controlling the effectiveness of said light sensitive cells upon the input of said control tube.

11. In a talking motion picture apparatus, an amplification system, a sound reproducer connected with the output of said amplification system, a control tube connected with the input of said amplification system, a pair of separate sound heads each including an exciter lamp, an optical system, a sound film and a light sensitive cell, a power supply source, a two-position switch, and means for mechanically actuating said two-position switch for electrically connecting said power source with either of said exciter lamps and simultaneously connecting the light sensitive cell in the sound head of the said exciter lamp with the input circuit of said control tube.

12. In a talking motion picture apparatus, an amplification system, a sound reproducer connected with the output of said amplification system, a control tube connected with the input of said amplification system, a pair of sound heads each including an exciter lamp, an optical system, a sound record and a light sensitive cell, a potentiometer having the midpoint thereof connected with the control grid of said control tube, one end of said potentiometer being connected with one terminal of one of said light sensitive cells and the other end of said potentiometer being connected with a terminal of the other of said light sensitive cells, a variable tap on said potentiometer for selectively controlling the effect of either of said light sensitive cells upon said control tube, an actuating arm movable simultaneously with the adjustment of said variable tap and a two position switch controlled by said actuating arm for selectively connecting either of said exciter lamps with a power source.

13. In a sound-on-film projecting apparatus, an alternating current power supply, an electron tube amplification system having a sound reproducer connected with the output circuit thereof and a light sensitive cell connected with the input circuit thereof, an exciter lamp for said light sensitive cell, and means for applying polarizing potential to the light sensitive cell comprising rectifier and filter devices connected to the alternating current power supply.

14. In a sound-on-film projecting apparatus, an alternating current power supply, an electron tube amplification system having a sound reproducer connected with the output circuit thereof and a light sensitive cell connected with the input circuit thereof, an exciter lamp for said light sensitive cell, and means for energizing said exciter lamp, the filaments of the electron tubes of the amplifier, and the field coil of the loud speaker, said means comprising rectifier and filter devices connected to the alternating current power supply.

15. In a sound-on-film projecting apparatus, an alternating current power supply, an electron tube amplification system having a sound reproducer connected with the output circuit thereof and a light sensitive cell connected with the input circuit thereof, an exciter lamp for said light sensitive cell, and means for applying potential to the light sensitive cell and the plate circuits of the amplifier comprising rectifier and filter devices connected to the alternating current power supply.

16. In a sound-on-film projecting apparatus, an alternating current power supply, an electron tube amplification system having a sound reproducer connected with the output circuit thereof and a light sensitive cell connected with the input circuit thereof, an exciter lamp for said light sensitive cell, and means for energizing the exciter lamp, the light sensitive cell, the amplifier and the sound reproducer field devices and circuits comprising two sets of rectifier and filter devices, one set for energizing and applying potential to some of the foregoing and the other set for energizing and applying potential to the remainder of same.

17. A system for reproducing sound embodying, in combination, a source of illumination, a photoelectric cell, a photographic record of sound, means to cause said record to travel between said source and said cell, means for reproducing said sound controlled from said cell, a source of alternating current, a rectifier and a filter in the supply circuit for said source of illumination and operating from said source of alternating current, said filter being arranged to reduce variations in the current supply to said source of illumination to such an extent that the effect of said variations is less than the effect of variations in the remainder of the system.

18. In a sound reproducing system, in combination, a source of illumination, a photoelectric cell, a film having a photographic record of sound, means to cause said film to travel between said source and said cell, means controlled from said cell for reproducing said sound, a source of alternating current, a supply circuit for said source of illumination comprising a rectifier and a filter operated from said source of alternating current and arranged to reduce the variations in said alternating current to such value that the noise caused by said variations produces no perceptible increase in the noise produced by other irregularities in said system.

19. A method of reproducing sound embodying in combination a source of illumination, a photoelectric cell, a photographic record of sound, means to cause said record to travel between said source and said cell, means for reproducing said sound controlled from said cell, a source of alternating voltage, a rectifier and a filter operated from said source of alternating voltage to supply a polarizing potential to said cell and arranged to reduce the variations in said potential to such value that the noise produced by said variations causes no perceptible increase in the noise produced by other irregularities in said system.

20. In a sound reproducing system, in combination, a photoelectric cell, a lamp exciting said cell, a photographic record of sound, means to cause said record to travel between said source and said cell, a thermionic amplifier controlled from said cell, a source of alternating voltage, a rectifier and a filter operated from said source of alternating voltage to supply a potential to said cell and the plate circuits of said amplifier and arranged to reduce the variations in said potential to such value that the noise produced by said variations is not materially greater than the noise produced by irregularities in said sound record.

21. In a sound reproducing system, in combination, a photoelectric cell, a lamp exciting said cell, a film having a photographic record of sound, means to cause said film to travel between said lamp and said cell, a thermionic amplifier controlled from said cell, a source of alternating current, a supply circuit for said lamp and the filaments of said amplifier operated from said source comprising a rectifier and a filter and arranged to reduce the variations in said alternating current to such value that the noise caused by said variations produces no perceptible increase in the noise produced by other irregularities in said system.

22. In combination, an output circuit, a plurality of sound heads therefor, means for traversing consecutive sound record sequences in said sound heads respectively, an energizing circuit for said sound heads, and means comprising a single potentiometer device connected between said energizing circuit and said sound heads for shifting and fading reproduction in said output circuit from one of said sound heads to another thereof.

ALWYN D. LASSITER.